US006212762B1

(12) United States Patent
Lucier

(10) Patent No.: US 6,212,762 B1
(45) Date of Patent: Apr. 10, 2001

(54) LUMBER TAGGER

(76) Inventor: David F. Lucier, 8629 Hampton Valley Rd., Emmitsburg, MD (US) 21727

(*) Notice: Subject to any disclaimer, the term of this patent is extended or adjusted under 35 U.S.C. 154(b) by 0 days.

(21) Appl. No.: 09/409,052

(22) Filed: Sep. 30, 1999

(51) Int. Cl.[7] .............................. B23P 19/00; B27F 7/00; A41H 37/04; B25C 5/00

(52) U.S. Cl. ................................ 29/701; 227/39; 227/40; 227/15; 227/100; 29/714

(58) Field of Search ............................ 29/701, 432, 798, 29/714, 716; 227/39, 40, 99, 100, 5, 6, 7, 15, 16, 17, 18; 144/358, 329

(56) References Cited

U.S. PATENT DOCUMENTS

| | | | | |
|---|---|---|---|---|
| 4,392,204 | * | 7/1983 | Prim et al. | 144/329 |
| 5,014,896 | * | 5/1991 | Reitmeier et al. | 227/39 |
| 5,021,837 | * | 6/1991 | Uto et al. | 227/99 |
| 5,195,672 | * | 3/1993 | Souverain | 227/21 X |
| 5,208,962 | * | 5/1993 | Walker | 29/432 |
| 5,775,397 | * | 7/1998 | Lippincott | 144/358 |
| 6,058,601 | * | 5/2000 | DeKoning | 227/100 |

FOREIGN PATENT DOCUMENTS 2731353 1/1979 (DE) .

* cited by examiner

*Primary Examiner*—S. Thomas Hughes
*Assistant Examiner*—Marc Jimenez
(74) *Attorney, Agent, or Firm*—Stephen R. Greiner

(57) ABSTRACT

An apparatus for tagging pieces of lumber including a motor-driven chain for positioning adjacent a lumber conveyor. A stapler is positioned adjacent one end of the chain for affixing a tag to a piece of lumber on the conveyor. A tag feeding attachment urges one tag of a contiguous sequence of tags into alignment with the stapler and severs the tag from the contiguous sequence of tags. A photosensor is positioned adjacent the stapler for detecting the presence of lumber upon the conveyor and for generating an electrical signal in response thereto. Upon receiving an electrical signal from the photosensor, a central processing unit energizes the stapler and the tag feeding attachment in a predetermined sequence.

4 Claims, 3 Drawing Sheets

LUMBER TAGGER

FIELD OF THE INVENTION

The present invention relates generally to staple driving apparatus with means to convey work relative to a driving station.

BACKGROUND OF THE INVENTION

It is common to place tags on dimension lumber for price and inventory control purposes. Affixing these tags to individual pieces of lumber has, unfortunately, been a time-consuming process. Although a staple gun is normally used, tagging proceeds slowly since manually positioning a staple gun and squeezing its trigger to affix a tag is a relatively slow endeavor. Thus, a manufacturer of large quantities of lumber can find itself employing, at high cost, several laborers for tagging purposes.

Efforts to automate the process of tagging lumber have not met with great success. Normal variations in the length, width, and height of dimension lumber from one piece to another have plagued past designers by making it difficult to affix tags in rapid succession. Warps or twists in many lumber pieces further complicate the matter of affixing tags. A need, therefore, exists for an automated apparatus which is capable of rapidly affixing tags to an indefinite number of lumber pieces regardless of slight variations in the length, width, height and shape of the lumber pieces.

SUMMARY OF THE INVENTION

In light of the problems associated with the known apparatus for affixing tags to dimension lumber, it is a principal object of the invention to provide a lumber tagger which, with little or no human intervention, will staple tags in rapid succession onto the ends of a plurality of lumber pieces which may vary somewhat from one to the other in terms of: length, width, height and the presence of warps.

It is another object of the invention to provide a lumber tagger of the type described which makes minimal physical contact with lumber being tagged in order to reduce wear upon its parts and to maximize its useful life.

It is an object of the invention to provide improved elements and arrangements thereof in a lumber tagger for the purposes described which is lightweight in construction, relatively inexpensive to manufacture, and fully dependable in use.

Briefly, the tagger in accordance with this invention achieves the intended objects by featuring a motor-driven chain for positioning adjacent a lumber conveyor. A stapler is positioned adjacent the chain for driving a staple through a tag and into a piece of lumber on the conveyor. A tag feeding attachment urges one tag of a contiguous sequence of tags into alignment with the stapler and severs the tag. The stapler and tag feeding attachment are actuated in sequence by a central processing unit in response to signals from a photosensor positioned near the stapler.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
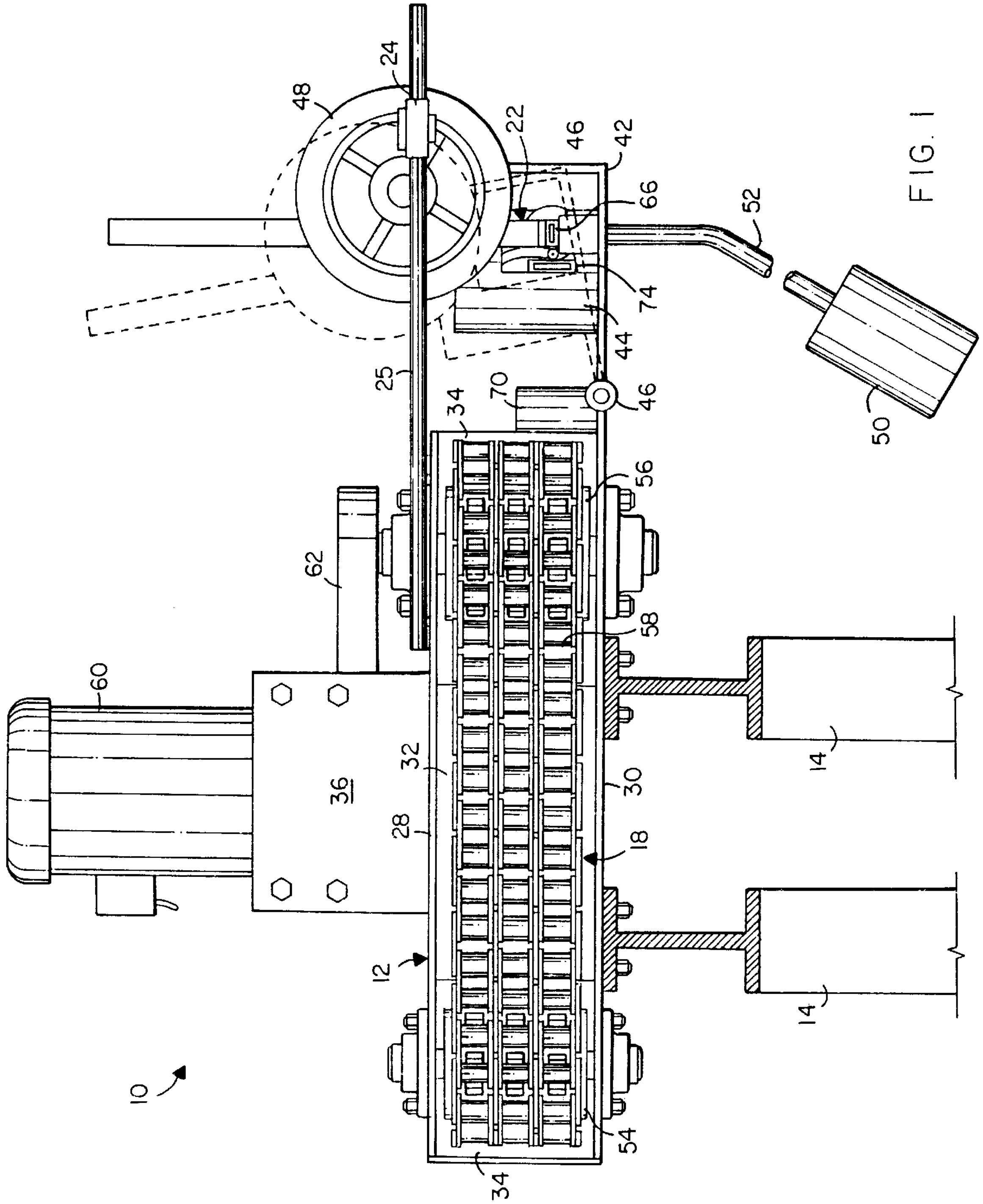
FIG. 1 is a side view of a lumber tagger in accordance with the present invention.
Figure 2:
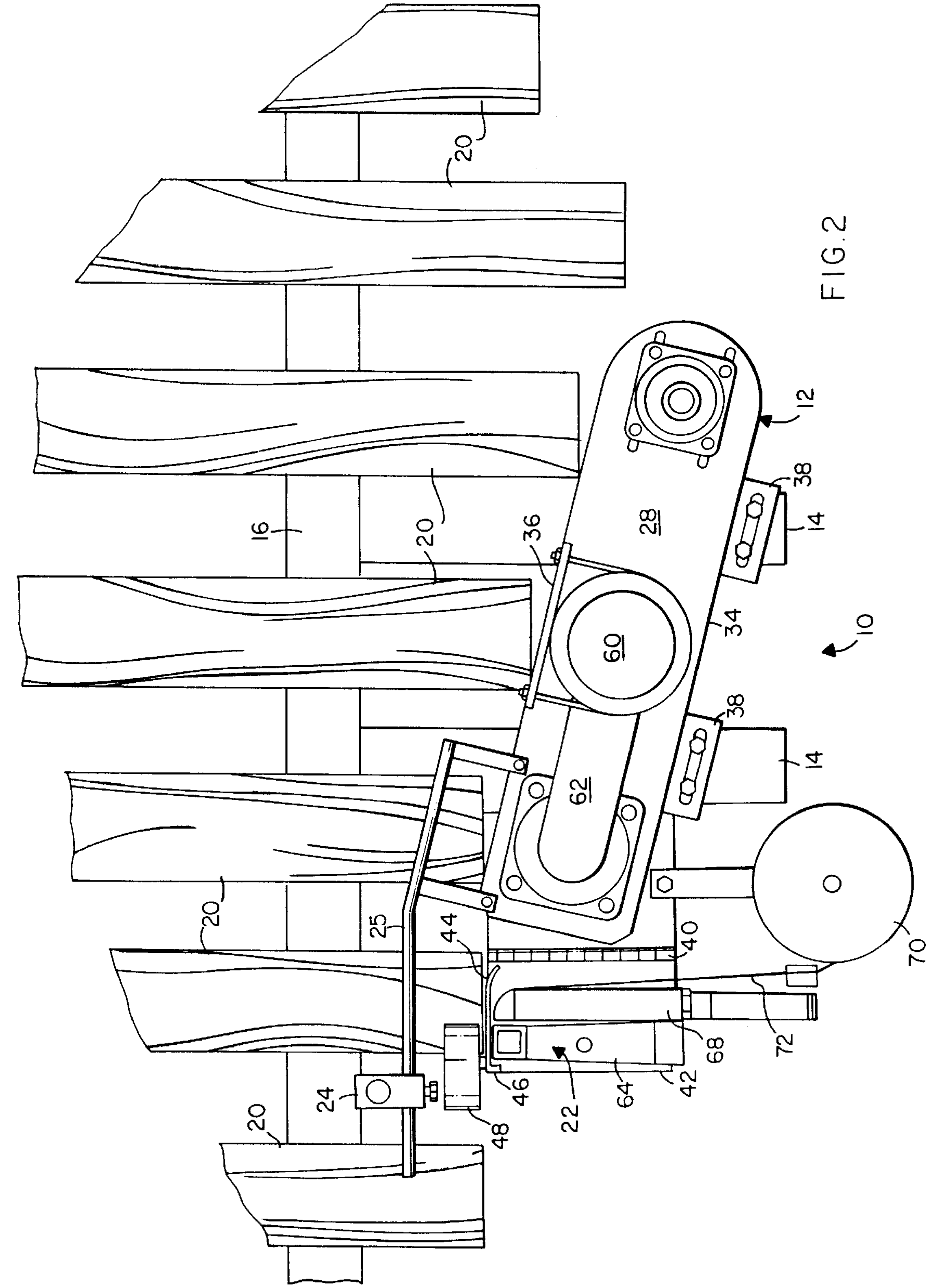
FIG. 2 is top view of the lumber tagger of FIG. 1 shown positioned against a lumber conveyor for use.
Figure 3:
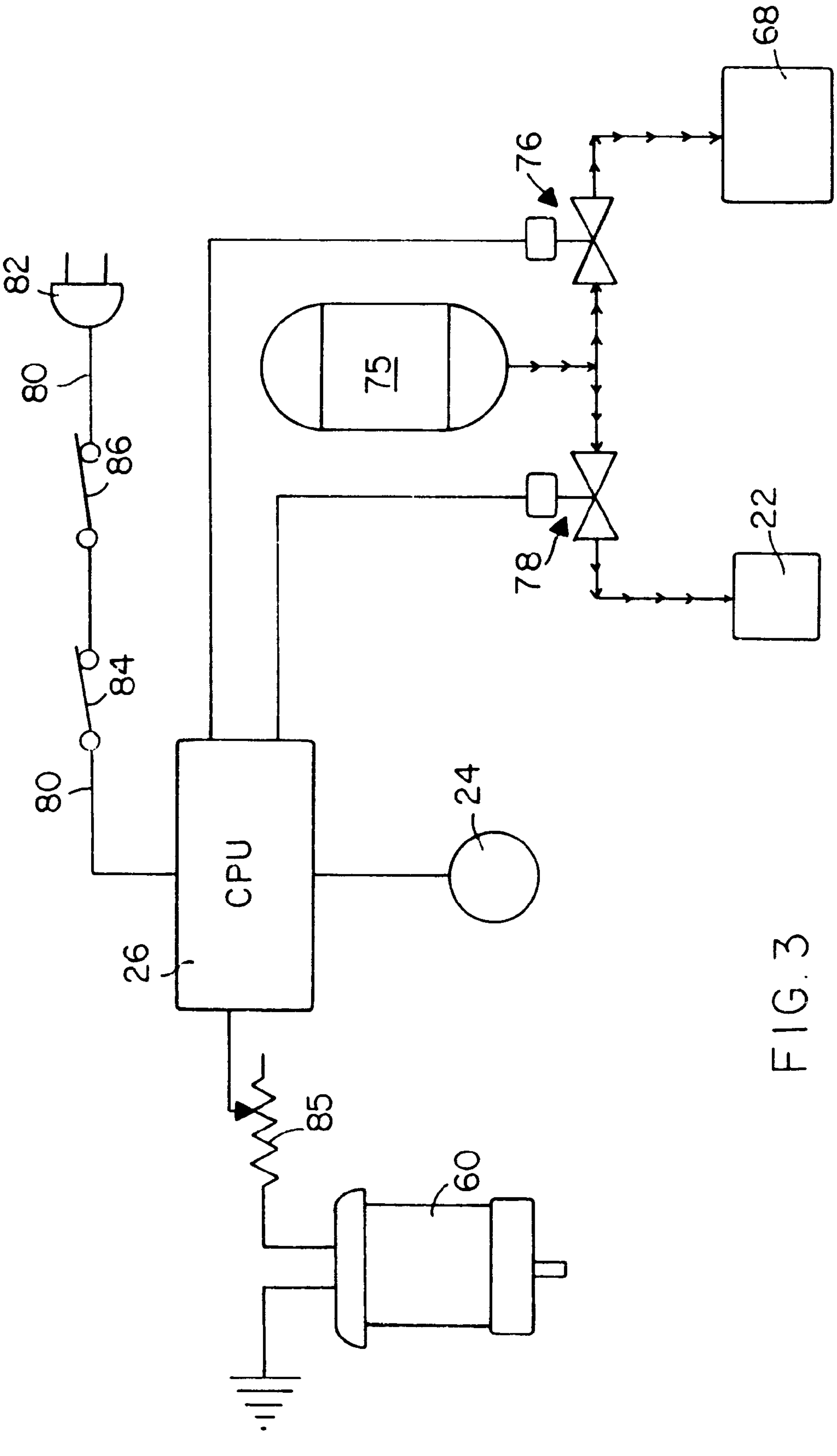
FIG. 3 is a schematic diagram showing the control system for the lumber tagger.

Referring now to the FIGS., a lumber tagger in accordance with the present invention is shown at 10. Tagger 10 includes a frame 12 adapted for mounting upon supports 14 for a horizontal conveyor 16. Frame 12 carries a feeder 18 which adjusts the positions of pieces of lumber 20 on conveyor 16 so that they pass an adjacent stapler 22 at a predetermined distance. As lumber pieces 20 move past stapler 22 on conveyor 16, a fixed field photosensor 24 detects their presence and sends an electrical signal to a remote, central processing unit (CPU) 26 which, in turn, energizes stapler 22 so as to affix a tag (not shown) to a lumber piece 20 with a staple (not shown).

Frame 12 is constructed principally of heavy gauge metal sheeting and includes a top wall 28, a bottom wall 30, front wall 32, and a back wall 34 connecting the top and bottom walls together. A motor mounting plate 36 extends upwardly from top wall 28. Brackets 38 extend rearwardly from bottom wall 30 for mounting frame 12 on conveyor supports 14.

Connected to one end of bottom wall 30 by a hinge 40 is a stapler support platform 42. Platform 42 has a front side from which a guard plate 44 extends upwardly to prevent the inadvertent contact of lumber pieces 20 with stapler 22. On the side of platform 42 opposite hinge 40, a column 46, carrying a roller 48 at its upper end, is secured. The roller 48 is adapted to engage a lumber piece 20 having warps thereby elevating the platform 42 and permitting stapler 22 to staple a tag into the center of the warped piece.

To prevent stapler 22 from jumping upward when roller 48 contacts a lumber piece 20, a counterweight 50 is attached to the bottom of platform 42 by means of an elongated rod 52. As shown, rod 52 is slanted to project counterweight 50 toward bottom wall 30. Not only does such a positioning keep counterweight 50 beneath bottom wall 30 or platform 42 during normal use of tagger 10 but such also helps maintain even an pressure on a warped lumber piece 20 through roller 48 regardless of the inclination of platform 42 and rod 52.

Feeder 18 includes a pair of spaced-apart, sprocket wheels 54 and 56 supporting an endless chain 58 in a position to engage the ends of lumber pieces 20 on conveyor 16 at a slight angle when viewed from above. Wheel 56 is connected to a variable speed motor 60 via drive unit 62 such that chain 58 can be moved at the same speed as conveyor 16. During use, lumber pieces 20, having variable initial positions on conveyor 16, are pushed by chain 58 laterally across conveyor 16 so that they will pass by stapler 22 at a set distance.

Stapler 22 is substantially like the one shown in U.S. Pat. No. 5,014,896, issued May 14, 1991, to Reitmeier et al and incorporated for all purposes herein. The construction of stapler 22 will not be belabored, however, such includes a pneumatic staple gun 64 secured to platform 42 which, upon actuation, drives staples (not shown) from a head 66 located adjacent guard plate 44 toward lumber pieces 20. A pneumatic tag feeding attachment 68 is joined to staple gun 64 and has a roll support 70 rearward of head 66. Tags, connected together so as to form a roll 72, are delivered from support 70 to a cutter 74 located next to head 66 by feeding attachment 68.

The tagging sequence is not actuated by the manual squeeze of a trigger as is shown by Reitmeier et al but, rather, is automatically controlled by CPU 26. Thus, at a set time after receiving a signal from photosensor 24, secured by arm 25 to top wall 28, CPU 26 delivers a signal to a solenoid-actuated air valve 76 operatively coupled with tag feeding attachment 68. Upon receiving the latter signal, valve 76 is opened to deliver compressed air from tank 75 to tag feeding attachment 68 which is thereby energized to advance a part of roll 72 past cutter 74 which, then, slices a single label from roll 72.

Almost simultaneously with the single label being sliced, CPU 26 sends a signal to a solenoid-actuated air valve 78 operatively coupled with stapler 22. Upon receiving the signal, valve 78 is opened to actuate staple gun 64 with air from tank 75 and drive a staple outwardly from head 66 through the label severed from roll 72 and into an adjacent lumber piece 20. After a short interval, both solenoid-actuated air valves 76 and 78 are closed by CPU 26.

From the foregoing, it should be appreciated that the use of tagger 10 is straightforward. First, a plurality of lumber pieces 20 are unloaded onto moving conveyor 16. As lumber pieces 20 engage chain 58 (whose speed is adjusted to correspond with that of conveyor 16 by varying electrical current flow to motor 60 through variable resistor 85), such are pushed laterally to a fixed distance from stapler 22. Next, photosensor 24 detects the leading edge of a lumber piece 20 and sends a signal to CPU 26 to initiate the tagging sequence.

Tagging proceeds automatically without any human intervention. First, tag feeding attachment 68 is actuated via the opening of valve 76 to cut a single tag from its outer end. After several milliseconds have elapsed, staple gun 64 is energized by opening valve 78 to drive a staple through the tag and into a lumber piece 20. If the lumber piece 20 had an appreciable warp, the stapler 22 would have been elevated by means of roller 48 thereby ensuring that the staple and tag would be attached to the warped lumber piece at a set distance from its top edge. After another short interval, feeding attachment 68 and staple gun 64 are deenergized by closing valves 76 and 78. Deenergization of tag feeding attachment 68 causes such to advance tag roll 72 toward cutter 74 in anticipation of the severance of another tag from roll 72.

Tagger 10 includes an electrical lead 80 with a plug 82 at its free end for connection to a source of electrical power. A switch 84 in lead 80 permits tagger 10 to be readily turned on and off. A "kill" switch 86, also on lead 80, may be mounted in a prominent location for deenergizing tagger 10 in the event of an emergency.

While the invention has been described with a high degree of particularity, it will be appreciated by those skilled in the art that modifications may be made thereto. For example, a belt may be substituted for chain 58 with slight modifications to wheels 54 and 56. Therefore, it is to be understood that the invention is not limited to the sole embodiment described above, but encompasses any and all embodiments within the scope of the following claims.

I claim:

1. A lumber tagger, comprising:

a frame being mounted adjacent a lumber conveyor, said frame including:
- a bottom wall;
- a stapler support platform hingedly attached to said bottom wall; and,
- a roller secured to said stapler support platform for elevating said stapler support platform when engaging a piece of lumber on the lumber conveyor;

a pair of spaced-apart, sprocket wheels on said bottom wall of said frame;

an endless chain carried by said wheels for engaging lumber on the lumber conveyor;

a motor on said frame and coupled with one of said wheels for driving said chain;

a stapler on said stapler support platform of said frame and positioned adjacent one of said wheels for driving a staple through an aligned tag to affix the tag to a piece of dimension lumber;

a tag feeding attachment on said frame, said tag feeding attachment for urging a single tag of a contiguous sequence of tags into alignment with said stapler and for severing the single tag from the contiguous sequence of tags;

a photosensor secured to said frame and positioned adjacent said stapler, said photosensor being adapted to detect the presence of a piece of lumber upon the lumber conveyor and generate an electrical signal in response to detecting the presence of a piece of lumber; and, a central processing unit connected to said photosensor, said central processing unit being adapted to energize said stapler and said tag feeding attachment in a predetermined sequence in response to receiving said electrical signal from said photosensor.

2. The lumber tagger according to claim 1 further comprising a counterweight suspended by a rod from said stapler support platform.

3. A lumber tagger, comprising:

a frame being mounted adjacent a lumber conveyor, said frame including:
- a bottom wall;
- a stapler support platform hingedly attached to said bottom wall; and,
- a roller secured to said stapler support platform for elevating said stapler support platform when engaging a piece of lumber on the lumber conveyor;

a pair of spaced-apart, sprocket wheels on said bottom wall;

an endless chain carried by said wheels for engaging lumber on the lumber conveyor;

a motor on said frame above said bottom wall and coupled with one of said wheels for driving said chain;

a stapler on said stapler support platform and positioned adjacent one of said wheels for driving a staple through an aligned tag to affix the tag to a piece of dimension lumber;

a tag feeding attachment for urging a single tag of a contiguous sequence of tags into alignment with said stapler and for severing the single tag from the contiguous sequence of tags;

a photosensor secured to said bottom wall and positioned adjacent said stapler, said photosensor being adapted to detect the presence of a piece of lumber upon the lumber conveyor and generate an electrical signal in response to detecting the presence of a piece of lumber; and, a central processing unit connected to said photosensor, said central processing unit being adapted to energize said stapler and said tag feeding attachment in a predetermined sequence in response to receiving said electrical signal from said photosensor.

4. The lumber tagger according to claim 3 further comprising a counterweight suspended by a rod beneath said stapler support platform.

* * * * *